United States Patent
Levine et al.

(10) Patent No.: US 7,966,350 B2
(45) Date of Patent: Jun. 21, 2011

(54) EVIDENCE REPOSITORY APPLICATION SYSTEM AND METHOD

(75) Inventors: Jack Levine, San Mateo, CA (US); Suzanne Stewart, Los Altos, CA (US); Laurie Johnson, Hayward, CA (US); Sally McCarthy, San Bruno, CA (US); Samantha Phillips, San Mateo, CA (US); Rob Patchett, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 442 days.

(21) Appl. No.: 12/101,155

(22) Filed: Apr. 11, 2008

(65) Prior Publication Data

US 2009/0259677 A1 Oct. 15, 2009

(51) Int. Cl.
*G06F 7/00* (2006.01)
(52) U.S. Cl. ........................... 707/812; 707/805
(58) Field of Classification Search .................. 707/812, 707/805; 370/408
See application file for complete search history.

(56) References Cited

U.S. PATENT DOCUMENTS

| 2004/0153656 A1* | 8/2004 | Cluts et al. ............... 713/186 |
| 2008/0077530 A1* | 3/2008 | Banas et al. .............. 705/50 |
| 2008/0159317 A1* | 7/2008 | Iselborn et al. ........... 370/408 |

* cited by examiner

*Primary Examiner* — Shahid A Alam
*Assistant Examiner* — Donald Lawson
(74) *Attorney, Agent, or Firm* — Kilpatrick, Townsend & Stockton LLP

(57) ABSTRACT

An evidence repository application system provides a centralized repository of implementation evidence data for a project and to provide a method for collecting, storing and tracking the implementation evidence data for the project. The evidence repository application system receives and stores evaluation data regarding the implementation evidence data. The evidence repository application system generates interactive reports summarizing the evaluation data for a project. The evidence repository application system implements a consistent approval process for a project with identified accountable managers and evidence providers. The evidence repository application system also implements an accountability process that notifies accountable managers and evidence providers of their roles and responsibilities for a project.

4 Claims, 13 Drawing Sheets

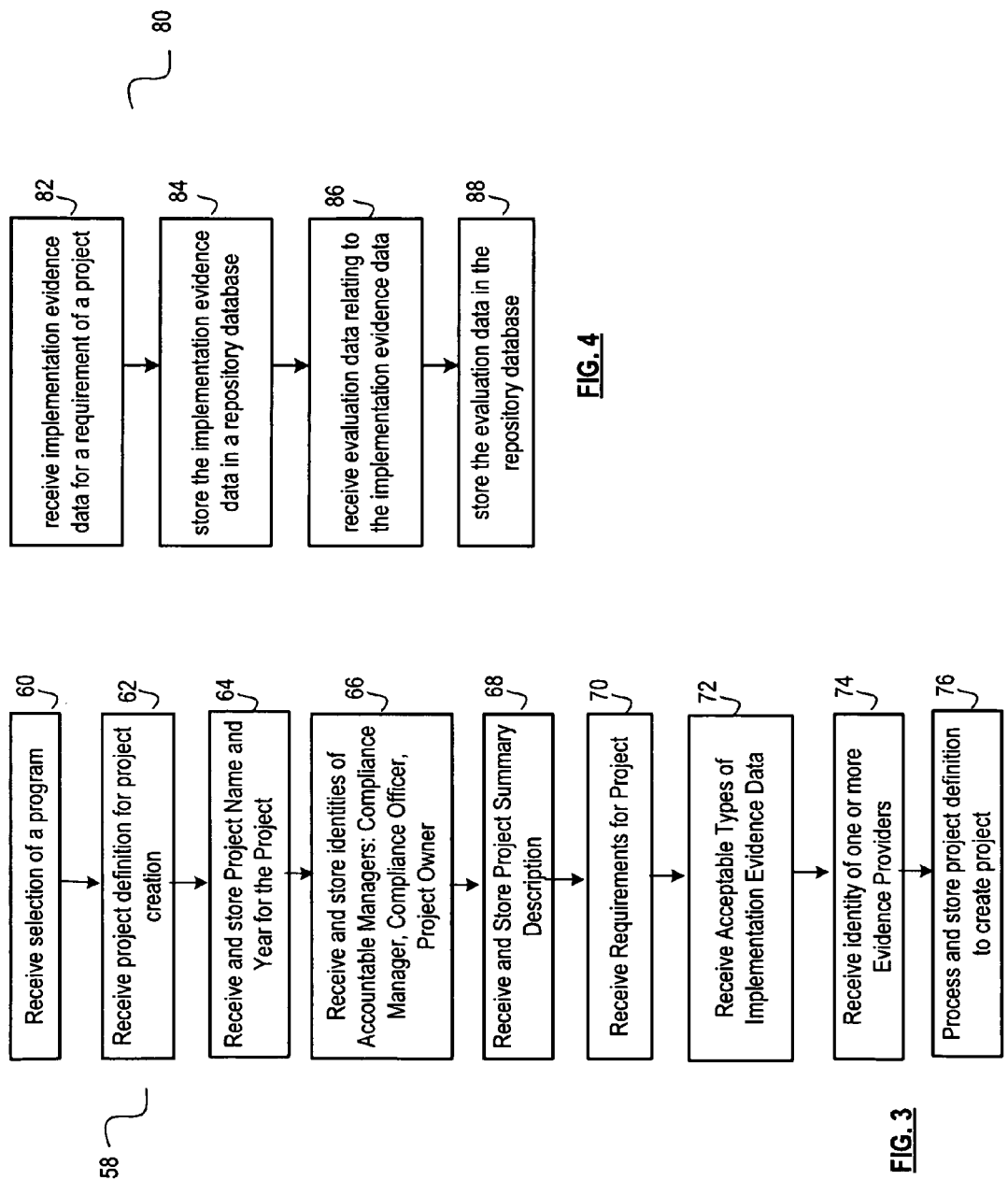

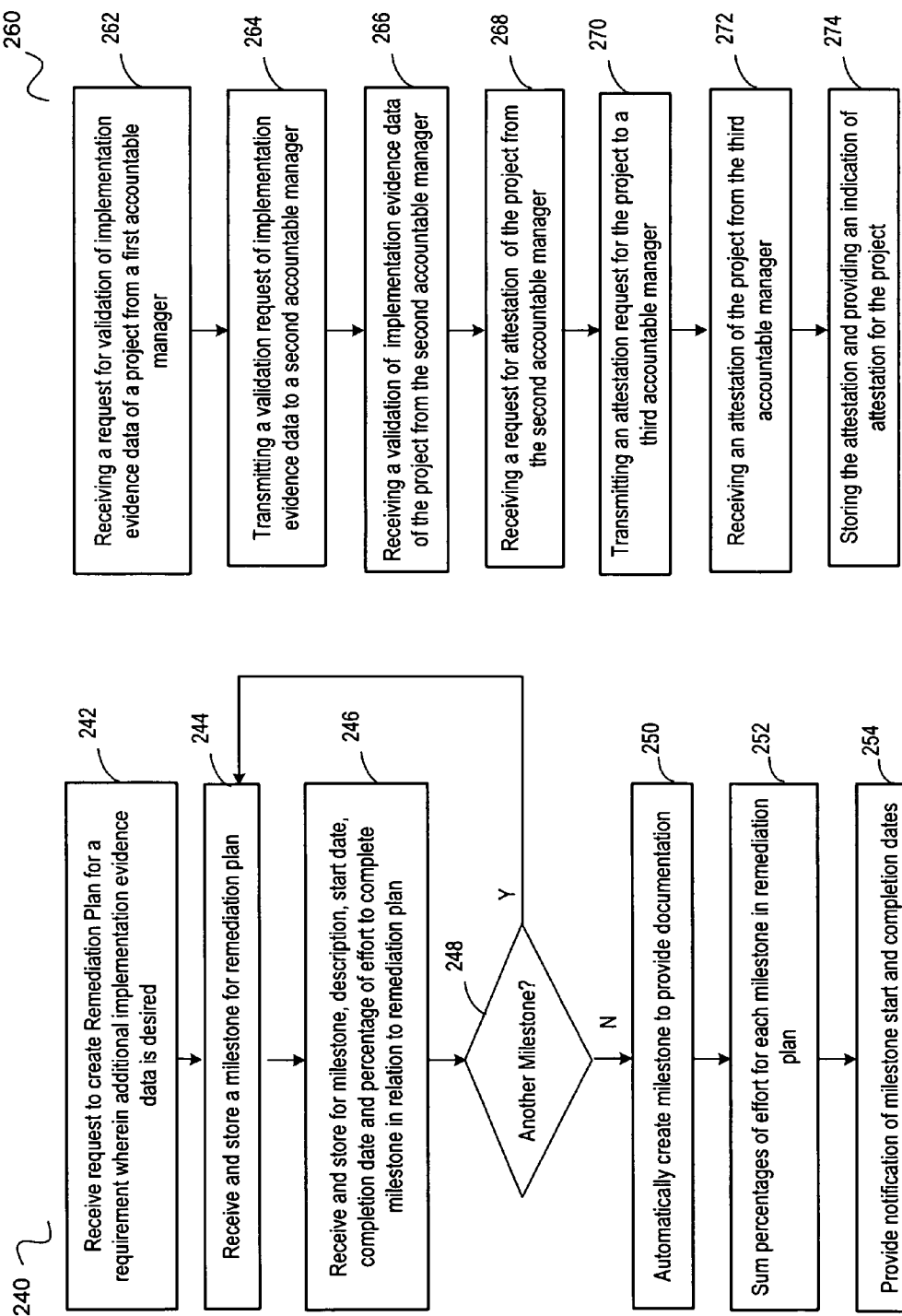

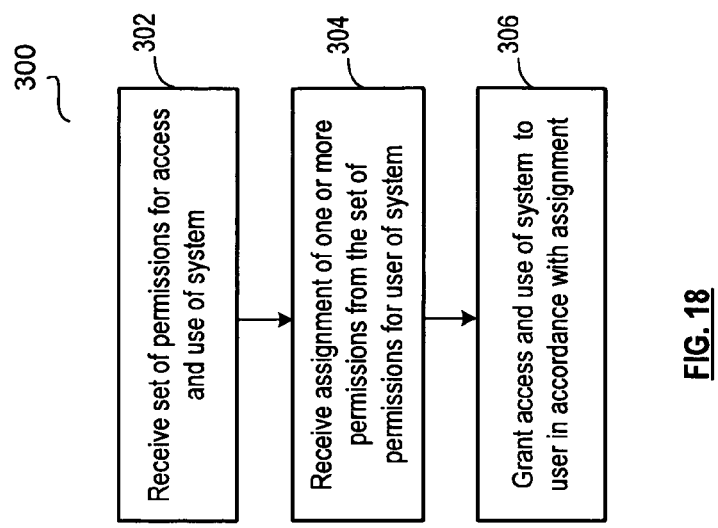
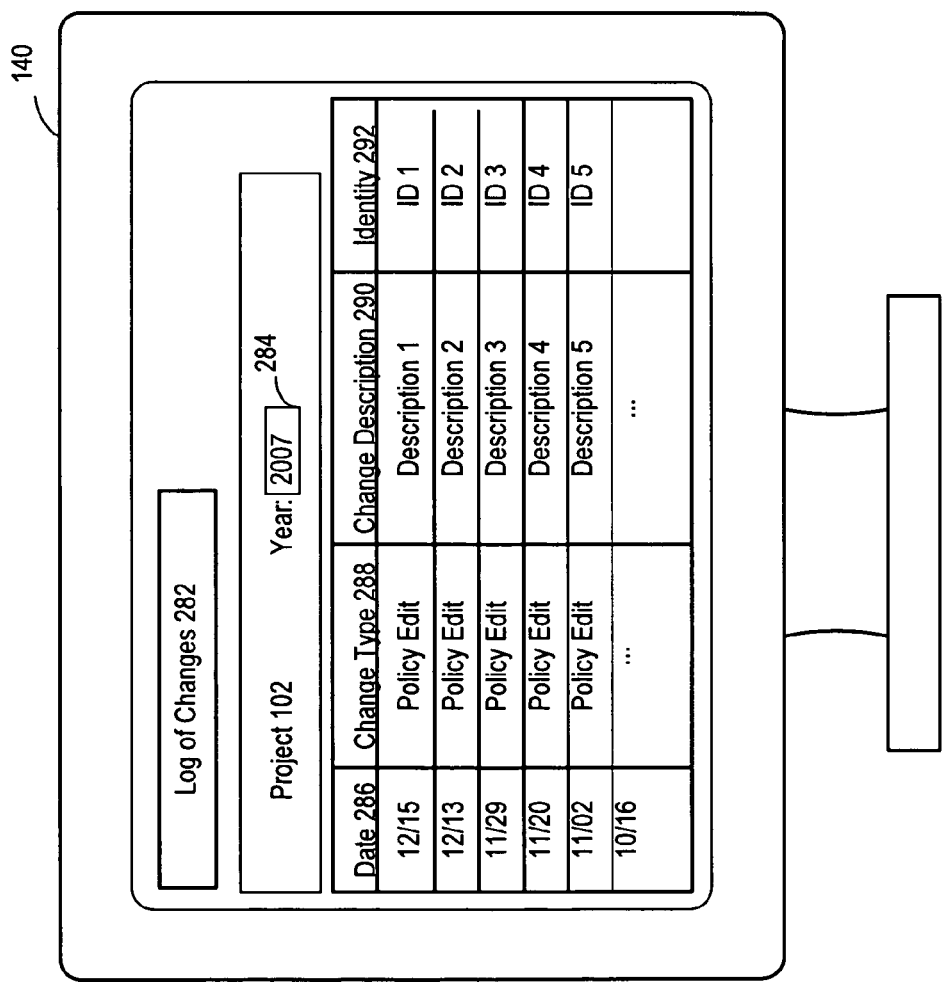

EVIDENCE REPOSITORY APPLICATION SYSTEM AND METHOD

CROSS-REFERENCE TO RELATED PATENTS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates to data management and in particular to a project data management system and method.

2. Description of Related Art

When an organization implements a policy, a process or a system, the organization often needs to verify implementation of the policy, demonstrate implementation of the process, or validate usage of the system. However, there are currently various problems with providing the evidence necessary to verify such implementation. One existing problem is that the necessary evidence may be widely dispersed throughout the organization and difficult to locate. Furthermore, if located, the necessary evidence may not be inventoried or stored in an accessible manner. For example, a risk management group in an organization may need to verify implementation of a corporate control policy but are unable to locate and organize fact-based evidence of implementation. As another example, an accounting group may need to attest to regulatory compliance but do not have the necessary documentation of implementation of procedures. As yet another example, an information technology group may need to demonstrate security testing status of a worldwide set of systems without a fully documented inventory.

Another problem in verifying implementation of a policy, a process or a system is that the management of an organization may have little knowledge of the relative completeness or strength of the evidence underlying the verification. For example, the management may unknowingly attest to claims of compliance for a policy with unsubstantiated evidence, such as verbal assurance, rather than any fact-based documented evidence. In addition, a claim by management of global compliance with a corporate control may unknowingly be based on documented evidence only provided by some but not all business units.

Another problem is that approval methods for a policy, a process or a system often lack definitive personnel accountability, clear and repeatable methodology, and documented tracking of activities and changes. Across an organization, there may be various policy, process and system implementation and approval processes where: the personnel accountabilities are unclear, unconfirmed and undocumented; methodologies are fluid and informal; and the activities and revisions are undocumented and untracked. This type of disorganization results in extra time, inconsistent processes and arbitrary basis for approvals.

As such, a need exists for a system and methodology for managing, tracking, rating and approving implementation evidence of a policy, a process or a system.

BRIEF DESCRIPTION OF THE SEVERAL VIEWS OF THE DRAWINGS

FIG. 3 is a logic flow diagram of an embodiment of a method for project creation by the evidence repository application system in accordance with the present invention;

FIG. 4 is a logic flow diagram of an embodiment of a method for processing implementation evidence data and evaluation data by the evidence repository application system in accordance with the present invention;

FIG. 15 is a logic flow diagram of an embodiment of a method for creating a remediation plan by the evidence repository application system in accordance with the present invention;

FIG. 16 is a logic flow diagram of an embodiment of a method for an approval process of a project by the evidence repository application system in accordance with the present invention;

FIG. 17 is a schematic block diagram of an embodiment of a graphical user interface of log of changes by the evidence repository application system in accordance with the present invention; and FIG. 18 is a logic flow diagram of an embodiment of a method for access restrictions by the evidence repository application system in accordance with the present invention.

DETAILED DESCRIPTION OF THE INVENTION

In accordance with an embodiment of the invention, an evidence repository application system is operable to provide a centralized repository of implementation evidence data for a project and to provide a method for collecting, storing and tracking the implementation evidence data for the project. In accordance with an embodiment of the invention, the evidence repository application system is operable to generate project reports and manage approval process for the project. These and other functions of the evidence repository application system in accordance with embodiments of the invention are described herein.

Figure 1:
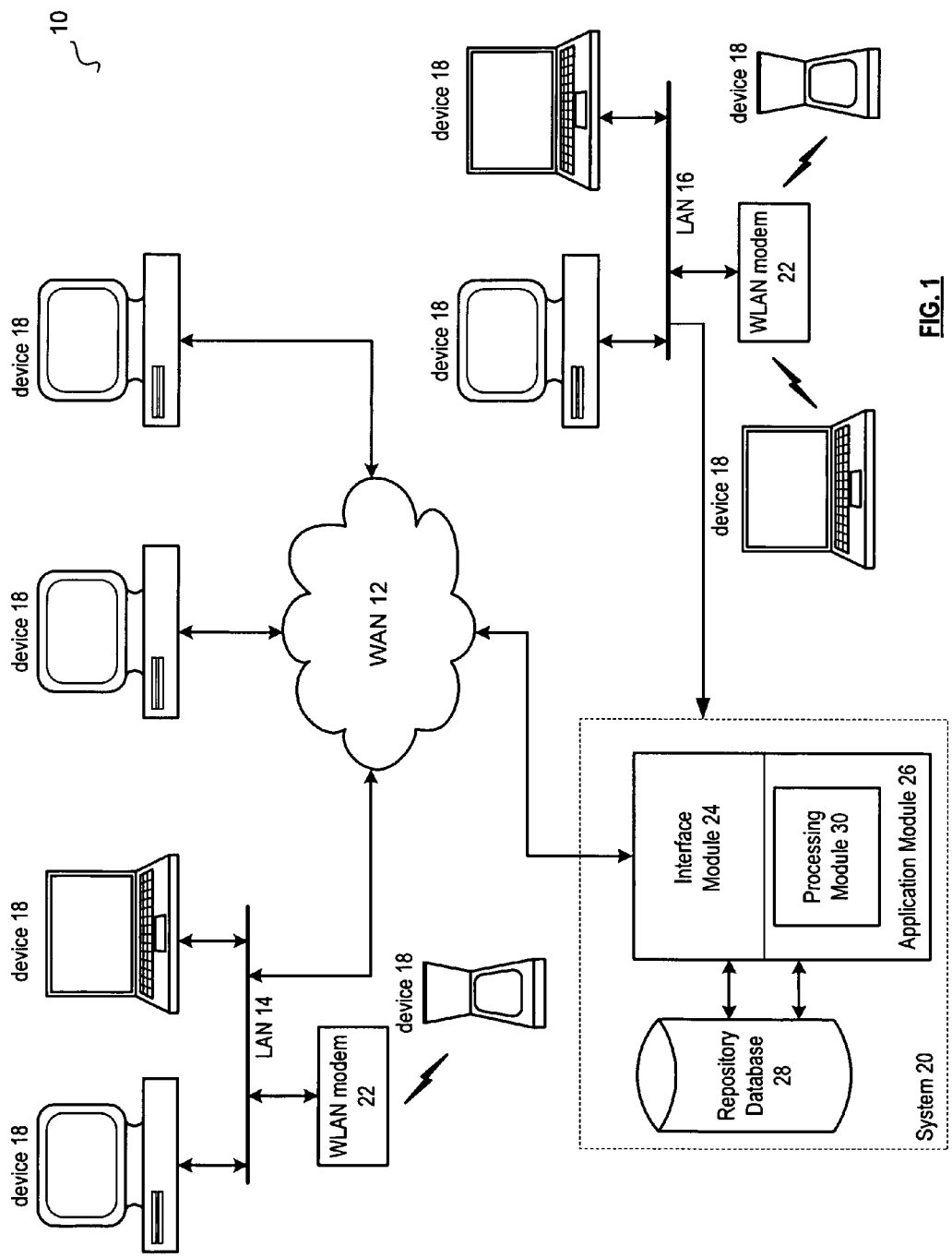
FIG. 1 is a schematic block diagram of an embodiment of network systems operable to implement the evidence repository application system and method in accordance with the present invention.

FIG. 1 is a schematic block diagram of an embodiment of a network system 10 in which the evidence repository application (ERA) system 20 may be implemented in accordance with the present invention. The network system 10 includes one or more networks, such as wide area network (WAN) 12 and local area networks (LAN) 14, 16 that are operable to communicate with the system 20. A plurality of devices 18 are connected to the WAN 12, the LAN 14 and LAN 16. Some of the devices 18 may be connected via a wireless LAN modem 22, a cellular network or other type of wireless network (not shown). The devices 18 include a personal computer, a laptop, a wireless phone, a personal digital assistant or other device operable to communicate over the WAN 12, LAN 14 or LAN 16 with the system 20.

The system 20 includes an interface module 24, an application module 26 and a repository database 28. The interface module 24 is operable to interface with the plurality of devices 18 over the LAN 16, the WAN 12, and/or the LAN 14. In an embodiment, the interface module 24 includes a network card, a web or file server that is operable to communicate using the Hyper Text Transfer Protocol (HTTP) protocol, File Transfer Protocol (FTP) or other protocol operable to communicate data, such as Hypertext Markup Language (HTML) documents, text, images, audio, videos or other types of data. The interface module 24 may also include a firewall or authentication capability that requires password or other authentication data prior to allowing access to some or all of the resources of the system 20. The interface module 24 may also include gateway, proxy server functions or modems, network terminals or other hardware or software devices that are operable to provide communication between the system 20 and the devices 18.

In an embodiment, the application module 26 is a server with a processing module 30 operable to perform functions described herein. In general, the processing module 30 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 30 includes a memory that is an internal memory or an external memory. The memory of the processing module 30 may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, processing module may execute hard coded and/or operational instructions stored by the internal memory and/or external memory to perform the steps and/or functions illustrated in FIGS. 1 through 18 described with respect to the application module 26. The application module 26 and the interface module 24 may be integrated into one or more devices or may be separate devices.

The system 20 also includes a repository database 28. The repository database 28 may be one or more databases implemented in internal memory devices, detached memory devices, network attached storage devices, storage area networks, or other storage devices located in one geographical location or multiple geographical locations. The repository database 28 may be structured as relational, network, hierarchal or object based or other type of structured database or document management application operable to store and locate data files. The repository database 28 is operable to communicate with the interface module 24 and the application module 26.

Figure 2:
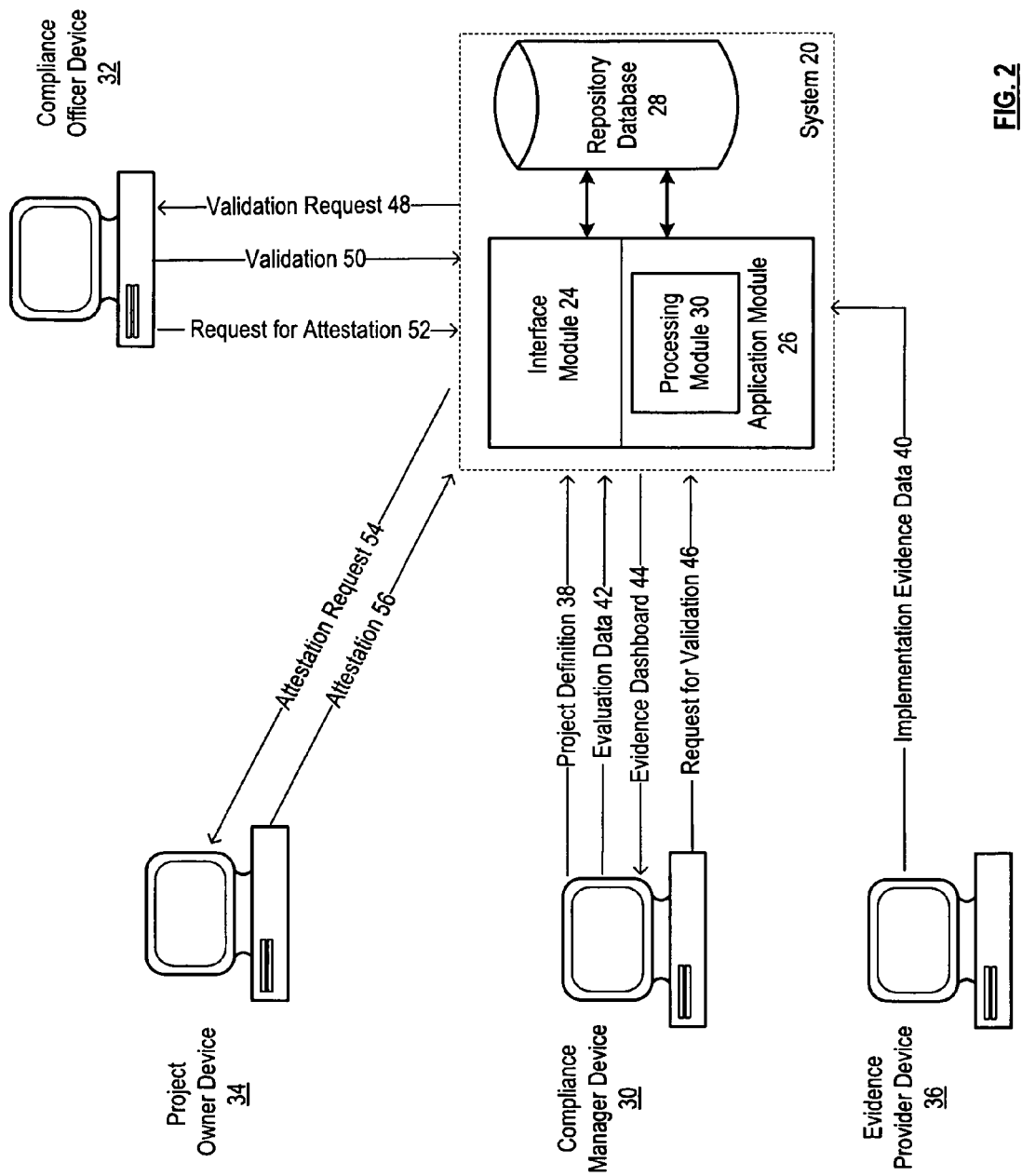
FIG. 2 is a logic flow diagram of an embodiment of the evidence repository application system and method in accordance with the present invention.

FIG. 2 illustrates the system 20, a compliance manager device 30, a compliance officer device 32, a project owner device 34, and an evidence provider device 36. Each of the devices 30, 32, 34, 36 may be any of the devices 18 described with respect to FIG. 1. In use, the compliance manager device 30 transmits and the system 20 receives a project definition 38. The project definition 38 includes a project name, a year, and a summary description of the project. In addition, the project definition 38 includes one or more identities (e.g., e-mail address, network address, cell phone number, computer identification code, etc.) for accountable managers for the project. The accountable managers are one or more persons, positions or entities that are responsible for workflow or approval process for the project. For example, the accountable managers for a project may include a compliance manager, a compliance officer and a project owner. Though certain roles and responsibilities are described herein for the accountable managers, these roles and responsibilities may be assigned to one or more other accountable managers or other roles and responsibilities may be assigned to one or more of the accountable managers. In addition, though three accountable managers are described herein, less or more than three accountable managers may be assigned and more than one identity may be assigned for an accountable manager. For example, though one identity of a compliance manager may be assigned to a project in the embodiment of the invention in FIG. 2, in another embodiment, two identities for a compliance manager may be assigned to a project or the roles of compliance manager and compliance officer may be assigned to a single identity.

The project definition 38 further includes a plurality of requirements for the project and one or more types of implementation evidence data acceptable for one or more of the plurality of requirements. In this instance, the project definition 38 further includes one or more identities of an evidence provider. The identity of an evidence provider is assigned to a requirement to collect and transmit the type of implementation evidence data acceptable to the requirement. The evidence provider identity may be one or more names, positions, e-mail addresses, network address, computer identification code, cell phone number, or other identifying information. The system 20 processes the received project definition 38 and stores the data in the repository database 28 to create a project.

As explained in more detail below with respect to FIGS. 6 and 7, a notification of accountability including a type of acceptable evidence is transmitted from the system 20 to the evidence provider device. When the evidence provider accepts the notification of accountability, the evidence provider device 36 transmits implementation evidence data 40 to the system 20 in accordance with the type of acceptable evidence. The implementation evidence data 40 is data that demonstrates implementation of a requirement for the project, including data files, such as documents, spreadsheets, presentations, surveys, opinions, video, photos, audio type files or references, links, or other types of information. The compliance manager device transmits and the system 20 receives evaluation data 42 relating to the implementation evidence data 40. The evaluation data 42 includes data evaluating the implementation evidence data 40, such as completeness percentage, surety level or other criteria. The system 20 generates an evidence dashboard 44 for a project which summarizes the evaluation data 42 relating to the implementation evidence data 40 through one or more interactive reports. The compliance manager device 30 may access the system 20 to view the evidence dashboard 44 and to review the evaluation data 42 relating to the implementation evidence data 40.

The compliance manager device 30 may then transmit a request for validation 46 which is received by the system 20. The request for validation 46 is a request for validation that the implementation evidence data 32 for at least one requirement of a project is accurate, current and complete. For example, the request for validation 46 may include a request for validation that the implementation evidence data 32 for one requirement, more than one requirement or all the requirements of a project is accurate, current and complete. In response to receiving the request for validation 46, a validation request 48 is generated by the system 20 and is transmitted to the compliance officer device 32. The compliance officer device 32 may also access and display the evidence dashboard 44 to review the evaluation data 42 relating to the implementation evidence data 40. The system 20 then receives a validation 50 of the implementation evidence data 40 for the at least one requirement of the project from the compliance officer device 32.

The system 20 may then receive a request for attestation 52 for the project from the compliance officer device 32. The request for attestation 52 is a request for attestation that the implementation evidence data 40 for a project is accurate, current or complete. The request for attestation 52 may also include that the implementation evidence data 40 is sufficient to satisfy compliance with or implementation of the project. The system 20 receives the request for attestation 52 and generates an attestation request 54 for the project. In an embodiment, the system 20 transmits the attestation request 54 to the project owner device 34. The project owner device 34 may also access and display the evidence dashboard 44. The system 20 then receives an attestation 56 from the project owner device 34 that the implementation evidence data for a project is accurate, current or complete. The system 20 may also receive an attestation 56 from the project owner device 34 that the implementation evidence data 40 is sufficient to ensure compliance with the project or to show implementation of the project. Alternatively, the system 20 may receive from the project owner device 34 a customized attestation 56 or an attestation 56 with one or more exceptions. The system 20 receives the attestation 56 for the project from the project owner device 34 and stores the attestation 56 in the repository database 28.

The system 20 thus provides a centralized repository for implementation evidence data 40 of a project. In addition, by accessing the evidence dashboard 44 generated by the system 20, accountable managers may more easily assess the implementation evidence data 40 using the evaluation data 42 before validating or attesting to the implementation evidence data 40. In addition, the system 20 implements a consistent approval process for a project with identified accountable managers and evidence providers.

FIG. 3 is a logic flow diagram of an embodiment of a method for project creation 58 by the system 20 in accordance with the present invention. In step 60, the system 20 receives a selection of a program. A program may include projects that apply to a geographical area of a corporation or projects for a corporate department or projects relating to a corporate effort such as, corporate merger or corporate relocation. For example, a Company Region 1 program may include projects applicable to the entire Region 1 of the Company or for different departments in Region 1. An Accounts Payable program may include projects that apply to the global Accounts Payable department or projects that apply to different geographical areas. A corporate merger program may include projects required to implement the integration of two companies across various corporate departments. In step 62, a project definition 38 is received by the system 20 to create a project under the selected program. A project under the selected program comprises a policy, a process, a system (e.g., hardware, software, networking, security, system usage) or a standard for which data needs to be collected, stored and tracked. For example, a project may include providing evidence of implementation of compliance with a corporate policy or showing implementation of a process or tracking migration to a new hardware or software application or integration of information technology (IT) resources of two companies during a merger. The project definition 38 received by the system 20 includes information for the system 20 to create the project, such as the information described below with respect to steps 64 through 74.

In step 64, a project name and year for the project is received by the system 20. By specifying the year for the project, a continuous project that needs constant updating, such as compliance with a corporate policy, may be tracked year by year. In step 66, the system 20 receives one or more identities of accountable managers for the project and stores the identities in the repository database 28 with respect to the project. In an embodiment, the accountable managers for a project include a compliance manager, compliance officer and project owner. An identity for an accountable manager may include one or more names, positions, e-mail addresses, network address, computer identification code, cell phone number, or other identifying information. In step 68, the system 20 receives and stores a project summary description, which may include descriptions of the overall goals and purpose of the project.

In step 70, the system 20 receives and stores a plurality of requirements for the project. A requirement for a project is a step, milestone, action, policy or other information needed for the project. In step 72, the system 20 receives one or more acceptable types of implementation evidence data for each requirement. A type of implementation evidence data is a description of acceptable evidence for a requirement. For example, a type of implementation evidence data may specify a survey, an account spreadsheet, a training presentation, attendance of the training presentation, testimony, video, or other type of data. For example, a project may comprise tracking migration to a new software application, and one of the plurality of requirements may be attendance by application users at a training session for the software application. The types of implementation evidence data for the requirement may include a copy of a presentation for the training session, attendance records for the training sessions, evaluations of the training session by attendees, etc. In step 74, the system 20 receives identities (e.g., e-mail address, network address, cell phone number, computer identification code, etc.) of evidence providers. The evidence providers are assigned to collect and transmit implementation evidence data 40 to the system 20 for the requirements. An evidence provider may be assigned to each requirement or multiple evidence providers may be assigned to one requirement or the same evidence provider may be assigned to multiple requirements of the project. In step 76, the system 20 processes and stores the received project definition 38 and creates the project.

FIG. 4 is a logic flow diagram of an embodiment of a method 80 for processing implementation evidence data 40 and evaluation data 42 by the evidence repository application system 20 in accordance with the present invention. Once the project has been created in the system 20, then implementation evidence data 40 may be collected and entered into the system 20. In step 82, the system receives implementation evidence data 40 for at least one requirement of a plurality of requirements of a project. In an embodiment, the implementation evidence data 40 received for the at least one requirement is in accordance with the type of implementation evidence data desired for the requirement. In some instances, the type of implementation evidence data is the same for more than one requirement, and so the same piece of implementation evidence data may satisfy more than one requirement. In this case, the implementation evidence data does not need to be uploaded to the system 20 multiple times. Instead, the implementation evidence data is transmitted and uploaded for at least one of the requirements and a cross reference to the implementation evidence data is made in other requirements. In some instances, the type of implementation evidence data requested in the project definition is not attainable due to availability, cost, timing or other issues. Evidence provider and accountable managers may need to negotiate and agree on another type of implementation evidence data for the requirement. The system 20 is then updated with the modified type of implementation evidence data for the requirement. In step 84, the system 20 stores the implementation evidence data 40 in the repository database 28.

In step 86, the system 20 receives evaluation data 42 relating to the implementation evidence data 40 for the at least one requirement of the project. In step 88, the system 20 stores the evaluation data 42 in the repository database 28. In an embodiment, the evaluation data 42 received by the system 20 includes a percentage of completeness of the implementation evidence data 40 for the at least one requirement of the project and a surety level of the implementation evidence data. The surety level provides a measure of strength or a degree of reliability of the implementation evidence data 40. For example, the system 20 supports entry of three surety levels: (S1) Self-assessment, (S2) Some factual documentation, and (S3) Full Factual Documentation. For instance, for the requirement of attendance by application users at a training session for a new software application, one of the types of implementation evidence data for the requirement may be attendance records for the training sessions. If the attendance records are based on self-assessment, such as verbal promises of attendance, then a surety level of S1 may be assigned. If the attendance records are based on unmonitored sign-up sheets at a training session, then a surety level of S2 may be assigned. If the attendance records are prepared by the trainers at the training session by checking identification of attendees before and after the training sessions, then a surety level of S3 may be assigned. In addition, with respect to the percentage of completeness of the implementation evidence data 40, if the attendance records indicate that 80% of the required application users have attended the training sessions, then the percentage of completeness may be assigned at 80%. Thus, evaluation data relating to the implementation evidence data 40 of attendance at a training session may have a surety level of S3 but only a percentage of completeness of 80%. The evaluation data 42 may include other criteria for assessing the implementation evidence data 40, such as a currency rating indicating the relative currency of the implementation evidence data 40. For example, an average time since attendance of the training sessions by the required application users may be determined, and a currency rating assigned depending on the average time, e.g a higher currency rating for an average within three months than 6 months or 12 months. Other types of evaluation data may be received and processed by the system 20 as well.

Figure 5:
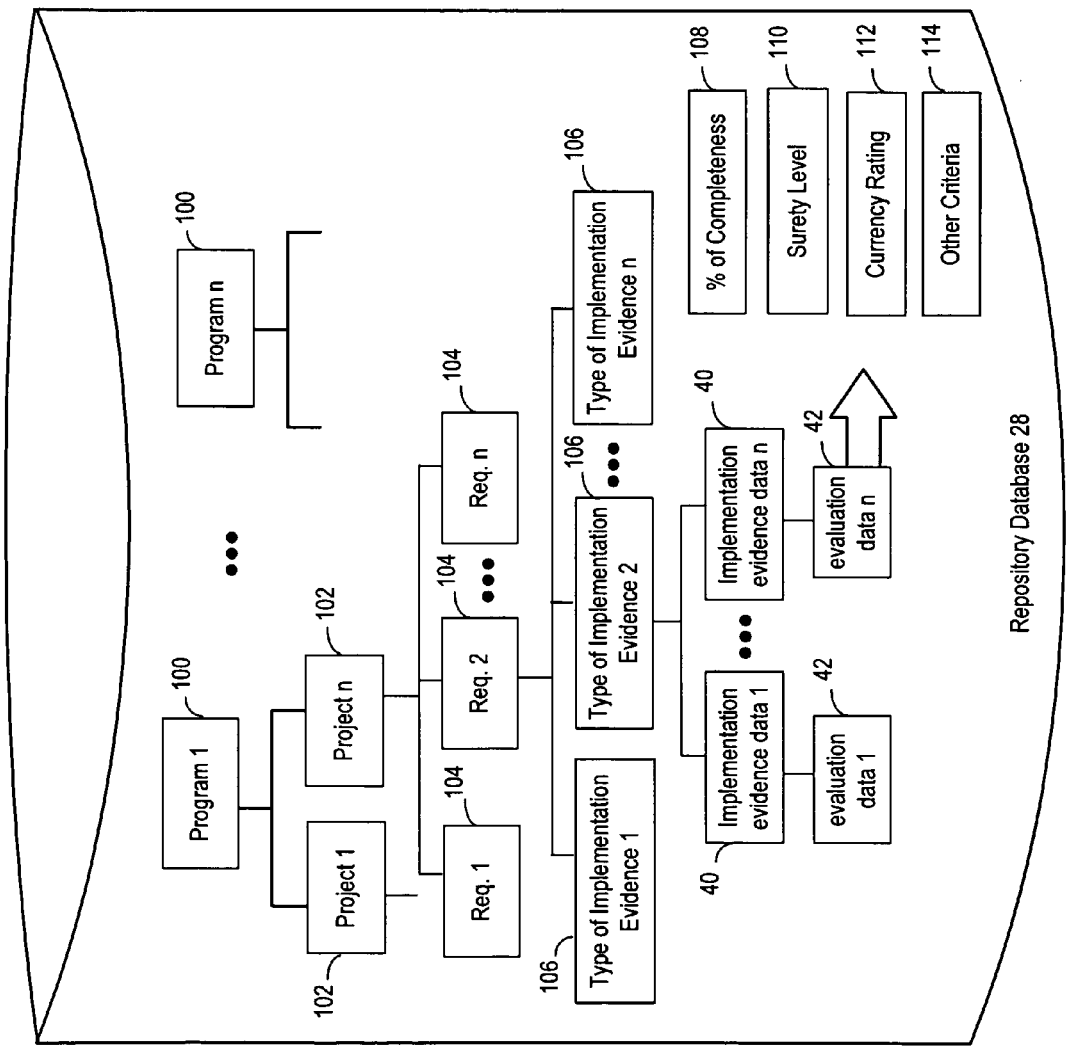
FIG. 5 is a schematic block diagram of data in the repository database of the evidence repository application system in accordance with the present invention.

FIG. 5 illustrates a schematic block diagram of an embodiment of the repository database 28 of the system 20 in accordance with the present invention. The repository database 28 may be structured as relational, network, hierarchal or object based or other type of structured database or document management application operable to store or manage data files. The repository database 28 stores one or more programs 100 and one or more projects 102 associated with a program 100. The repository database 28 stores a plurality of requirements 104 for a project 102. The repository database 28 stores one or more types of implementation evidence data 106 for a requirement 104. A type of implementation evidence data 106 may not be stored for a requirement 104 when no evidence is needed for the requirement. One or more pieces of implementation evidence data 40 are stored for a type of implementation evidence 40. Evaluation data 42 relating to the implementation evidence data 40 is also stored in the repository database 28. The evaluation data 42 includes data evaluating the implementation evidence data 40, such as a completeness percentage 108, a surety level 110, a currency rating 112 or other criteria 114. The evaluation data 42 may relate to one piece of implementation evidence data 40 or to multiple pieces of implementation evidence data 40 for a requirement. For example, implementation evidence data 40 for the training sessions may include multiple attendance records. The evaluation data 42 would then relate to the multiple attendance records. However, if the implementation evidence data 40 is a training presentation, the evaluation data 42 may then relate only to that piece of implementation evidence data 40.

Figure 6:
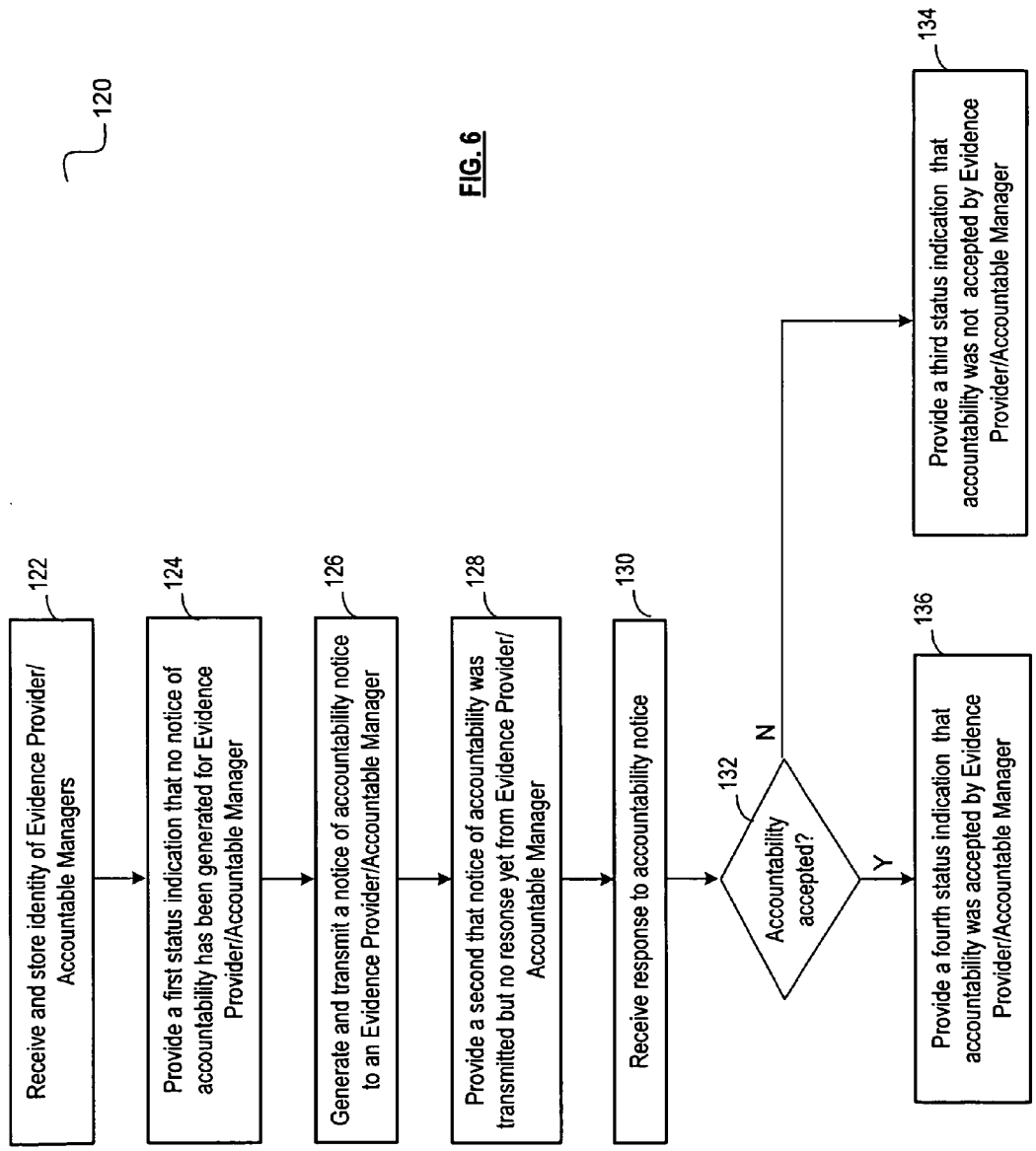
FIG. 6 is a logic flow diagram of an embodiment of a method for processing acceptance of accountability by the evidence repository application system in accordance with the present invention.

FIG. 6 is a logic flow diagram of an embodiment of a method 120 for processing acceptance of accountability by the system 20 in accordance with the present invention. In step 122, the system 20 receives an identity of an evidence provider or an identity of an accountable manager, such as an identity of a compliance manager, a compliance officer or a project owner. In step 124, the system 20 provides a first status indication that no accountability notice has been generated for the identified evidence provider or accountable manager. In step 126, the system 20 generates and transmits a notification of accountability to the evidence provider/accountable manager. The system 20 may receive a request that a notification of accountability be transmitted or the system may automatically generate the notice of accountability. The system 20 may also generate multiple notices of accountability and transmit a notification of accountability to each identified evidence provider devices in a batch. In an embodiment, a notification of accountability to an identified accountable manager device is transmitted individually to avoid multiple notices to an accountable manager. However, in another embodiment, notice of accountability may be transmitted to the accountable manager devices for a project in a batch.

In step 128 in FIG. 6, the system 20 generates a second status indication that a notice of accountability has been transmitted to an evidence provider device or accountable manager device. In step 130, the system 20 receives a response to the notice of accountability from the evidence provider device or accountable manager device. In step 132, the system determines whether the evidence provider/accountable manager accepted the notice of accountability. In step 134, when the evidence provider/accountable manager refused acceptance of accountability, the system 20 provides a third status indication that accountability was not accepted by the evidence provider/accountable manager. In step 135, when the evidence provider/accountable manager accepted accountability, the system 20 provides a fourth status indication that accountability was accepted by the evidence provider/accountable manager.

Figure 7:
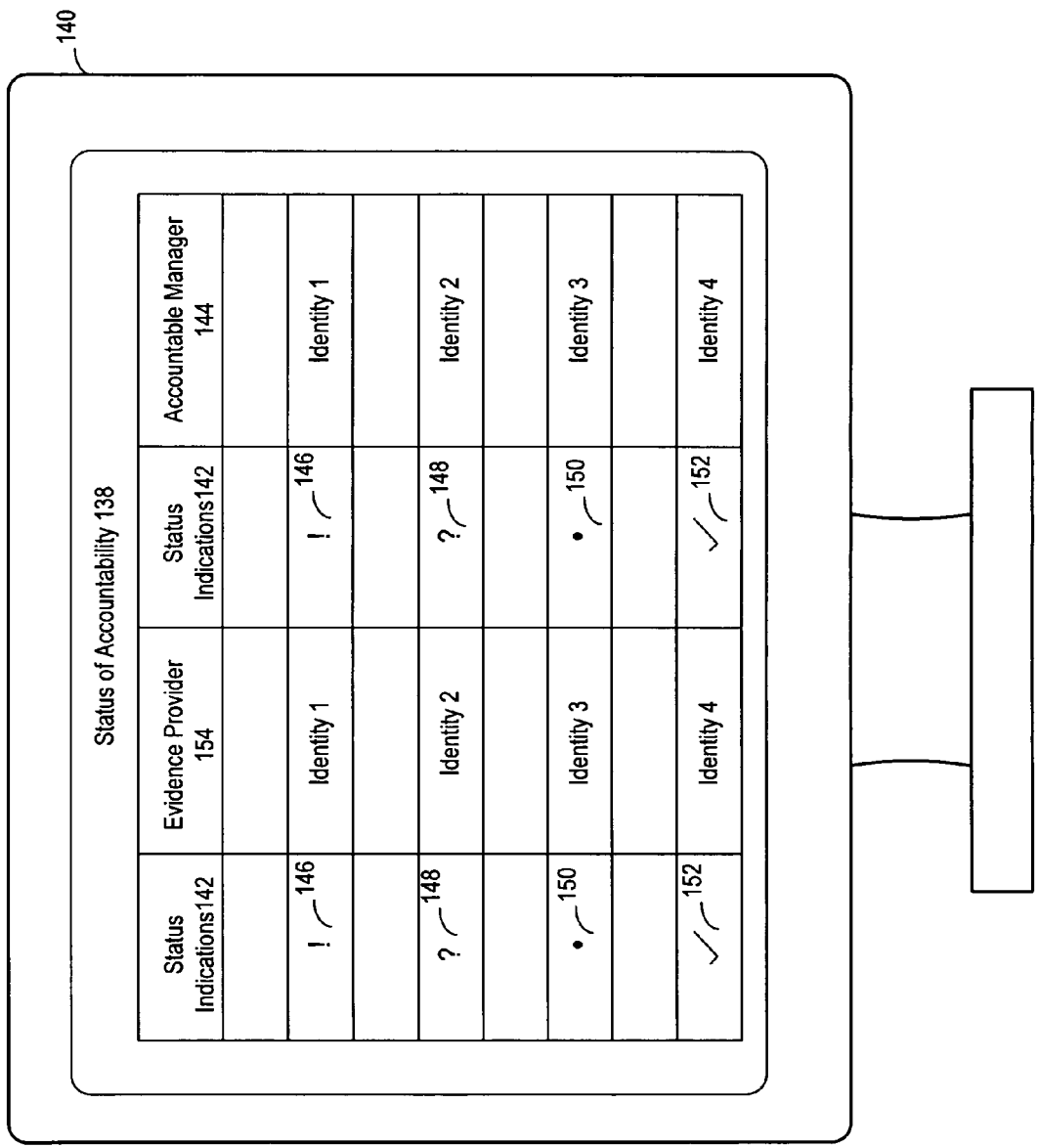
FIG. 7 is a schematic block diagram of an embodiment of a graphical user interface for displaying status of accountability by the evidence repository application system in accordance with the present invention.

FIG. 7 is a schematic block diagram of an embodiment of a graphical user interface (GUI) for displaying status of accountability 138 by the evidence repository application system 20 in accordance with the present invention. The display 140 for displaying the statue of accountability 138 may include any type of display for a device 18. The status of accountability 138 includes one or more status indications 142, one or more identities of accountable managers 144, and one or more identities of evidence providers 154. The status indications 142 for the identified accountable managers 144 and identified evidence providers 154 include: a first status indication 146 that no accountability notice has been generated for the identified evidence provider 154 or accountable manager 144; a second status indication 148 that a notice of accountability has been transmitted to the identified evidence provider 154 or accountable manager 144: a third status indication 150 that accountability was not accepted by the identified evidence provider 154 or identified accountable manager 144; and a fourth status indication 152 that accountability was accepted by the identified evidence provider 154 or identified accountable manager 144. Though the status indications 142 shown in FIG. 7 include symbols, other status indications 142 may be implemented in an embodiment of the invention, such as words, colors, video graphics, sounds, etc.

The process of acceptance of accountability 120 shown in FIGS. 6 and 7 provides a consistent process to notify accountable managers 144 and evidence providers 154 of their roles and responsibilities for a project 102. In addition, the status indications 142 provide an efficient method for assessing acceptance or rejection of the notice of accountability by an identified accountable manager 144 or identified evidence provider 154. As such, the identities of the accountable managers 144 and evidence providers 154 can be verified for the project because each identified accountable manager 144 and identified evidence provider 154 has been informed of their accountability with respect to the project and accepted the accountability. The system 20 thus implements an efficient method of acceptance of accountability 120 for notifying each identified accountable manager 144 and evidence provider 154 of their accountabilities, obtaining consent to accountability and providing status indications 142 of accountability.

FIGS. 8 through 14 illustrate an embodiment of the process for system 20 to provide an evidence dashboard 44. The system 20 generates an evidence dashboard 44 for a project 102 which summarizes the evaluation data 42 relating to the implementation evidence data 40 through one or more interactive reports. The evidence dashboard 44 may be accessed to review the evaluation data 42 relating to the implementation evidence data 40 by an accountable manager.

Figure 8:
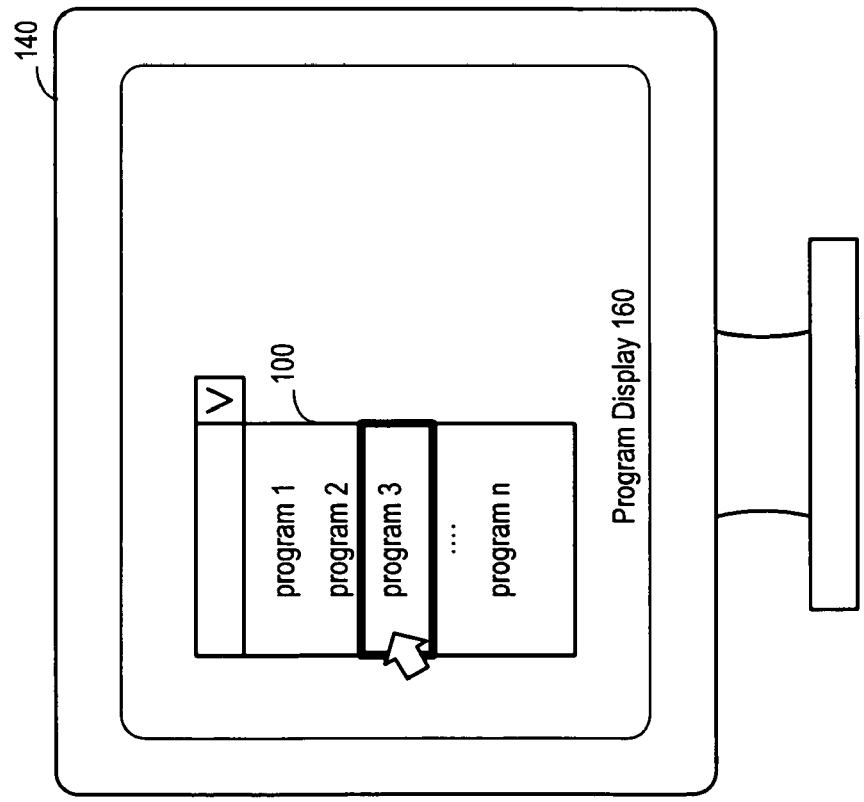
FIG. 8 is a schematic block diagram of an embodiment of a graphical user interface of a program display by the evidence repository application system in accordance with the present invention.

FIG. 8 is a schematic block diagram of an embodiment of a graphical user interface (GUI) of a program display 160 generated by the system 20 in accordance with the present invention. The program display 160 includes a display or listing of one or more programs 100. The listing of programs 100 may be shown in a drop down menu or other manner. Each of the displayed programs 100 may be selected in the graphical user interface to request a program report 164 as shown in FIG. 9.

Figure 9:
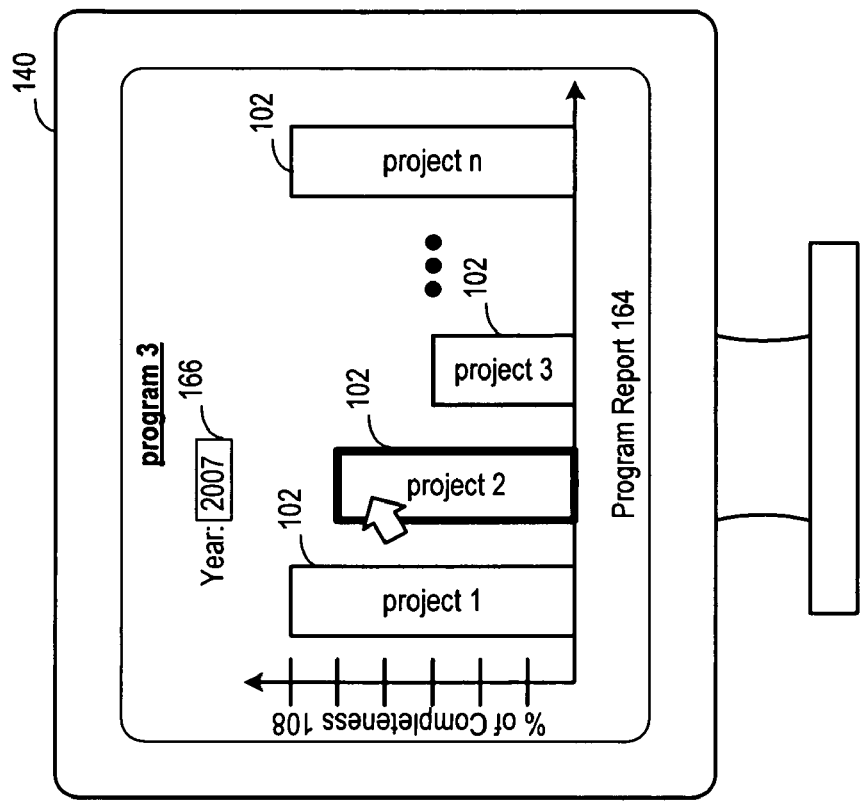
FIG. 9 is a schematic block diagram of an embodiment of a graphical user interface of a program report by the evidence repository application system in accordance with the present invention.

FIG. 9 is a schematic block diagram of an embodiment of a graphical user interface of a program report 164 generated by the system 20, in accordance with the present invention. The program report 164 displays one or more projects 102 that are part of the selected program 100. The program report 164 also summarizes evaluation data 42 for the one or more projects 102 in the program 100. In the example of FIG. 9, the percentage of completeness 108 of the implementation evidence data 40 for the projects 102 is summarized by a bar graph. Other evaluation data 42 may be summarized as part of the program report 164 using other types of graphs or charts. For example, a surety level 110 may be displayed for each project 102 in a graph rather than the percentage of completeness 108. The program report 164 may include a chart that displays a currency rating 112 and the percentage of completeness 108 of the evaluation data for each project 102. The program report 164 may also include a year selection 166 to select the year for the projects 100 in the program report 164. Each of the projects 102 may be selected in the graphical user interface of the program report 164 to request a project report 168 for the selected project 102 as shown in FIG. 10.

Figure 10:
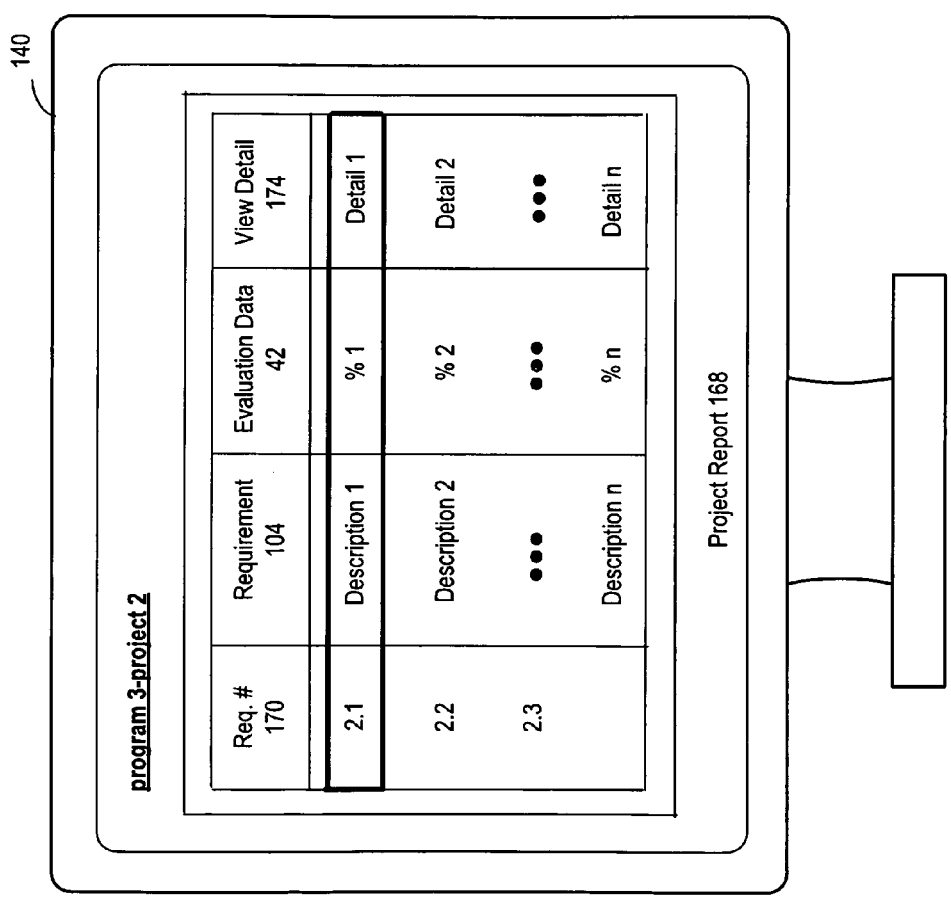
FIG. 10 is a schematic block diagram of an embodiment of a graphical user interface of a project report by the evidence repository application system in accordance with the present invention.

FIG. 10 is a schematic block diagram of an embodiment of a graphical user interface of a project report 168 by the system 20 in accordance with the present invention. The project report 168 summarizes evaluation data for a plurality of requirements 104 for the selected project 102. In an embodiment shown in FIG. 10, the project report 168 includes a number 170 of each requirement 104, each requirement 104, evaluation data 42 for each requirement 104, and a view detail selection icon 174 for each requirement 104. The evaluation data 42 displayed for each requirement 104 may be the percentage of completeness 108. Alternatively, or in addition to, the evaluation data 42 may be displayed for each of the plurality of requirements 104 in the project report 168. Each of the plurality of requirements 104 may be selected in the graphical user interface of the project report 168 to request a requirements report 180 for the selected requirement 104 as shown in FIG. 11.

Figure 11:
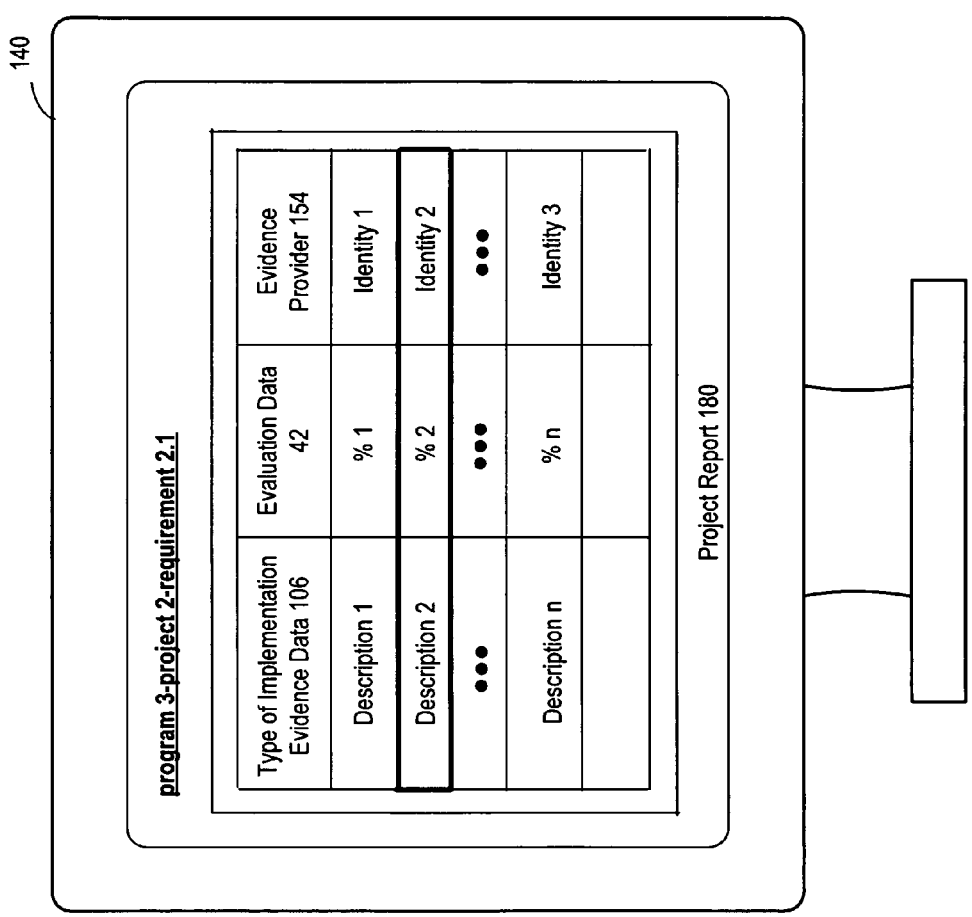
FIG. 11 is a schematic block diagram of an embodiment of a graphical user interface of a requirements report by the evidence repository application system in accordance with the present invention.

FIG. 11 is a schematic block diagram of an embodiment of a graphical user interface of a requirements report 180 generated by the system 20, in accordance with the present invention. The requirements report 180 summarizes the evaluation data 42 relating to the implementation evidence data 40 for the selected requirement 104. For instance, the requirements report 180 includes the type of implementation evidence data 106 desired for the selected requirement 104. The requirements report 180 also includes evaluation data 42 and an identity of an evidence provider 154 for each type of implementation evidence data 106. Each of the plurality of types of implementation evidence data 106 may be selected in the graphical user interface of the requirements report 180 to request an implementation evidence data report 190 for the selected type of implementation evidence data 106 as shown in FIG. 12.

Figure 12:
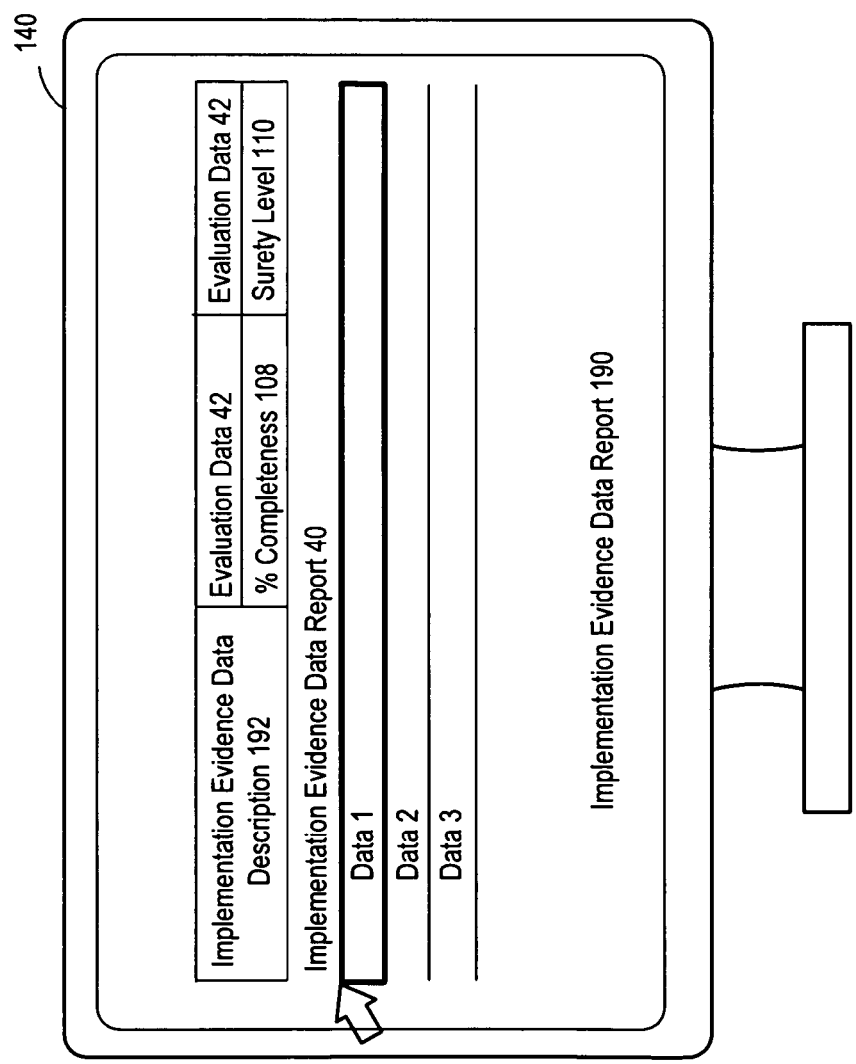
FIG. 12 is a schematic block diagram of an embodiment of a graphical user interface of an implementation evidence data report by the evidence repository application system in accordance with the present invention.

FIG. 12 is a schematic block diagram of an embodiment of a graphical user interface of an implementation evidence data report 190 by the system 20 in accordance with the present invention. The implementation evidence data report 190 lists the implementation evidence data 40 stored by the system 20 for the selected type of implementation evidence data 106 for the selected requirement 104. For instance, the implementation evidence data report 190 includes a description 192 of the implementation evidence data 104 and evaluation data 42 for the implementation evidence data 104. The evaluation data 42 of the implementation evidence data 104 includes a percentage of completeness 108 and a surety level 110. The implementation evidence data report 190 also includes a list of the implementation evidence data 40 stored by the system 20. One of the implementation evidence data 40 may be selected in the graphical user interface of the implementation evidence data report 190 to request the implementation evidence data 40 as shown in FIG. 13.

Figure 13:
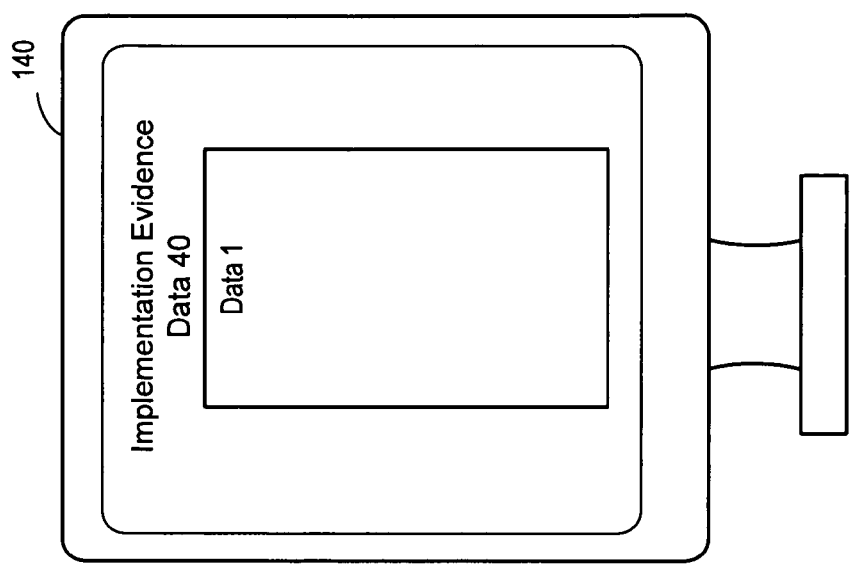
FIG. 13 is schematic block diagram of an embodiment of a graphical user interface of implementation evidence data stored by the evidence repository application system in accordance with the present invention.

FIG. 13 is schematic block diagram of an embodiment of a graphical user interface of the selected implementation evidence data 40 stored by the evidence repository application system 20 in accordance with the present invention. The system 20 displays the selected implementation evidence data 40.

Figure 14:
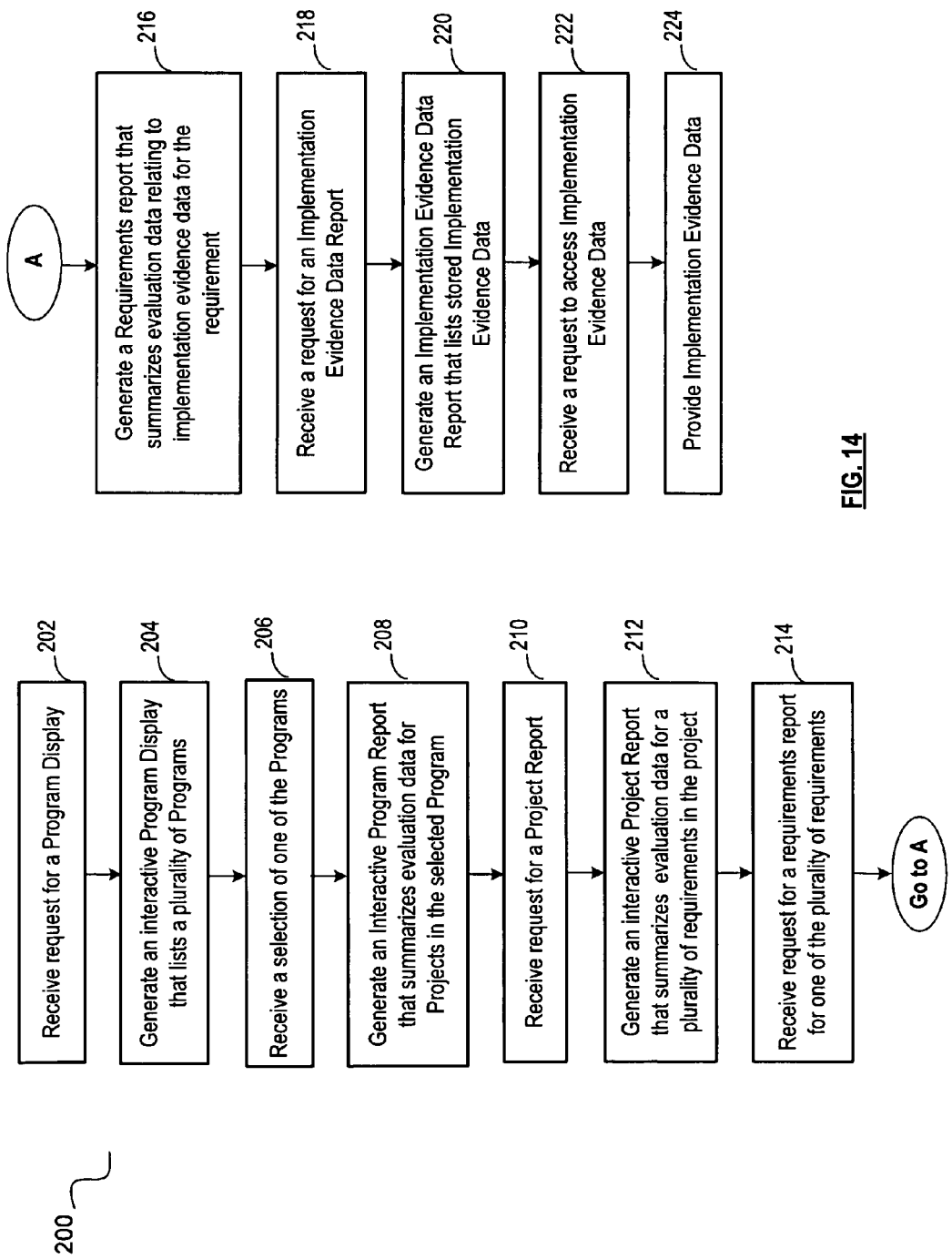
FIG. 14 is a logic flow diagram of an embodiment of an interactive report generation method by the evidence repository application system in accordance with the present invention.

FIG. 14 is a logic flow diagram of an embodiment of a method 200 for generating the evidence dashboard 44 by the system 20 in accordance with the present invention. In step 202, the system 20 receives a request for a program display 110. In step 204, the system 20 generates a graphical user interface (GUI) of an interactive program display 110 that lists a plurality of programs 100. In step 206, the system 20 receives a selection of one of the programs 100 in the program display 110. In step 208, the system 20 generates a GUI of an interactive program report 164 that summarizes the evaluation data 42 for a plurality of projects 102 in the program 100. In step 210, the system 20 receives a request for a project report 168 for one of the plurality of projects 102 in the program. In step 212, the system 20 generates an interactive project report 168 that summarizes the evaluation data 42 relating to implementation evidence data 40 for a plurality of requirements 104 of the project 102. In step 214, the system 20 receives a request for a requirements report 180 for at least one requirement of the plurality of requirements 104 of the project 102. In step 216, the system 20 generates a GUI of the requirements report 180 that summarizes the evaluation data 42 relating to the implementation evidence data 40 for the at least one requirement 104 of the plurality of requirements. In step 218, the system 20 receives a request for an implementation evidence data report 190 for the at least one requirement 104 of the plurality of requirements. In step 220, the system 20 generates a GUI of the implementation evidence data report 190 that lists the implementation evidence data 40 stored by the system 20 for the at least one requirement 104 of the plurality of requirements. In step 222, the system 20 receives a request to access one of the listed implementation evidence data 40 for the at least one requirement 104. In step 224, the system 20 generates a GUI of the requested implementation evidence data 40 for the at least one requirement 104.

In an embodiment, the system 20 generates the evidence dashboard 44 of interactive reports for one or more projects 102 as described with respect to FIGS. 8 through 14. The evidence dashboard 44 may be accessed to review the evaluation data 42 relating to the implementation evidence data 40. As such, accountable managers may better assess whether the implementation evidence data 40 for a project is accurate, current or complete prior to validating or attesting to the implementation evidence data 40 for a project. In addition, accountable managers are able to more easily determine from the evaluation data 42 whether implementation evidence data 40 is insufficient for a requirement or additional implementation evidence data is desired for a requirement. When additional implementation evidence data is desired for a requirement, the system 20 provides a method for creating a remediation plan for the requirement.

FIG. 15 is a logic flow diagram of an embodiment of a method 240 for creating a remediation plan by the system 20 in accordance with the present invention. In step 242, the system 20 receives a request to create a remediation plan for a requirement 104, wherein additional implementation evidence data 40 is desired for the requirement 104. In step 244, the system 20 receives and stores a milestone for the remediation plan. In step 246, the system 20 receives and stores a description of the milestone, a start date and a completion date for the milestone. The system 20 also receives a percentage of effort to complete a milestone in relation to the total effort to complete the remediation plan. For example, the percentage of effort to complete a milestone may consist of 20% of the 100% total effort to complete the remediation plan.

In step 248 of FIG. 15, the system 20 determines whether another milestone is desired for the remediation plan. When another milestone is desired, the system 20 returns to step 244 to receive and store the next milestone for the remediation plan. In an embodiment, when another milestone is not desired, the system 20 proceeds to step 250 to automatically create a milestone to provide documentation for the remediation plan and sets the percentage of effort at 10%. In step 252, the system 20 sums the percentages of effort for each milestone in the remediation plan. In step 254, the system 20 may provide notifications of key dates in the remediation plan, such as start and completion dates of milestones. For example, one type of notification may include a reminder notice in the form of one or more emails to the compliance manager or other accountable manager for the project that a milestone completion date is approaching within a time frame.

FIG. 16 is a logic flow diagram of an embodiment of a method for an approval process 260 of a project 102 by the system 20 in accordance with the present invention. In an embodiment, the system 20 implements a consistent approval process for a project 102 with identified accountable managers. In step 262, the system 20 receives a request for validation 46 of implementation evidence data 40 for a project 102 from a first accountable manager. In step 264, the system 20 transmits a validation request 48 to a second accountable manager and in step 266, receives a validation 50 of the implementation evidence data for the project 102 from the second accountable manager. In step 268, the system 20 receives a request for attestation 52 for the project 102 from the second accountable manager. In step 270, the system 20 transmits an attestation request 54 to a third accountable manager. In step 272, the system 20 receives an attestation 56 of the project 102 from the third accountable manager. In step 274, the system 20 stores the attestation 56 of the project 102 in the repository database 28 and provides an indication of the attestation 56 of the project 102.

The system 20 also includes various security features. In an embodiment, the security features of the system 20 include one or more change logs that track changes to data in the system 20.

FIG. 17 is a schematic block diagram of an embodiment of a graphical user interface of a log of changes 282 generated by the system 20, in accordance with the present invention. The log of changes 282 includes a selection for a project 102 and a year selection 284 for the project 102. The log of changes 282 then displays changes to data for the selected project 102 for the selected year 284.

The log of changes 282 includes a date 286 in which a change was made to data for the project 102 and the change type 288. The change type 288 describes a general category of the data or type of change made in the system 20. For example, the change type 288 may include policy edit, data upload, remediation milestone added, project creation, etc. The log of changes 282 also includes a change description 290 which provides a more detailed description of the change. For example, the change description 290 may state, "compliance manager identity changed from X to Y" or "remediation milestone added to remediation plan for Requirement 2.1". The log of changes 282 also includes an identity 292 of a person who made the change to the data of the project 102. Other information may be included in the log of changes 282 or other change logs may also be implemented.

FIG. 18 is a logic flow diagram of an embodiment of a method for access restrictions 300 by the system 20 in accordance with the present invention. The method for access restrictions 300 provides another security feature for system 20 for limiting the access and use of the data in the system 20. In step 302, the system 20 receives a set of permissions for access and use of the system 20. The set of permissions in an embodiment include view evidence dashboard 44, view attestations 56, view projects 102, create a project 102, edit a project definition 38, upload implementation evidence data 40 or evaluation data 42, view change logs and create a program 100. Other functions or data of the system 20 may also be included in the set of permissions. In addition, the set of permissions may be restricted to a particular project or program or requirement. In step 304 of FIG. 18, the system 20 then receives assignment of one or more permissions from the set of permissions for a user of the system 20. For example, an accountable manager 144 may be assigned permissions from the set of permissions to edit a project definition 38, view change logs, and view projects. An evidence provider 154 may be assigned permissions from the set of permissions to upload implementation evidence data 40 or evaluation data 42 but only for a particular requirement 104 for a particular project 102. In step 306, the system 20 grants access and use of the system 20 to a user in accordance with the assignment of permissions to the user.

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A method for managing implementation evidence data, comprising:

receiving, from a compliance manager device, a project definition, wherein the project definition includes a project description, a plurality of requirements for the project and one or more types of implementation evidence data desired for the plurality of requirements for the project;

receiving, from the compliance manager device, identity of at least one evidence provider device for the one or more types of implementation evidence data desired for the plurality of requirements for the project;

receiving, from the at least one of the evidence provider device, implementation evidence data in accordance with the one or more types of implementation evidence data for the plurality of requirements for the project;

receiving evaluation data relating to the implementation evidence data;

receiving, from the compliance manager device, a request for validation of the implementation evidence data for the project;

transmitting a validation request to a compliance officer device;

receiving a validation of the implementation evidence data for the project from the compliance officer device;

receiving a request for attestation request for the project from the compliance officer device;

transmitting an attestation request to a project owner device;

receiving an attestation of compliance of the implementation evidence data for the project from the project owner device;

receiving an identity of the compliance manager device, the compliance officer device and the project owner device;

transmitting a notification of accountability to the compliance manager device, the compliance officer device and the project owner device;

receiving an acceptance of accountability from the compliance manager device, the compliance officer device and the project owner device; and displaying an indication of the acceptance of accountability from the compliance manager device, the compliance officer device and the project owner device.

2. The method of claim 1, further comprising:
providing a set of permissions defining access to view and modify project data; and assigning one of the set of permissions to at least one of the at least one evidence provider device, the compliance manager device, the compliance officer device and the project owner device.

3. The method of claim 1, further comprising:
generating a graphical user interface (GUI) of a requirements report, wherein the requirements report summarizes the evaluation data relating to the implementation evidence data for each of the plurality of requirements for the project.

4. The method of claim 1, further comprising:
receiving a remediation plan for one of the plurality of requirements for the project, wherein the remediation plan includes one or more milestones with a start and completion date for each milestone and a percentage of effort to perform each milestone in relation to the remediation plan.

\* \* \* \* \*